United States Patent
Yutani et al.

(10) Patent No.: US 6,716,374 B2
(45) Date of Patent: Apr. 6, 2004

(54) CLAMP PRESSURE CONTROL METHOD FOR INJECTION MOLDING PROCESS

(75) Inventors: Hiroshi Yutani, Katano (JP); Shinji Kadoriku, Takarazuka (JP); Akira Yabe, Nabari (JP); Tadao Murata, Sanda (JP); Ryoma Murase, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 561 days.

(21) Appl. No.: 09/818,105

(22) Filed: Mar. 27, 2001

(65) Prior Publication Data

US 2001/0038157 A1 Nov. 8, 2001

(30) Foreign Application Priority Data

Mar. 30, 2000 (JP) ........................................ 2000-093306

(51) Int. Cl.$^7$ .............................................. B29D 11/00
(52) U.S. Cl. ........................ 264/1.33; 264/2.2; 264/40.5; 264/328.7; 425/810
(58) Field of Search ................... 264/2.2, 1.33, 264/40.5, 328.7, 106, 107; 425/810, 149, 150

(56) References Cited

U.S. PATENT DOCUMENTS

| 3,857,658 | A | | 12/1974 | Muzsnay |
| 4,917,840 | A | | 4/1990 | Harada et al. |
| 5,417,899 | A | * | 5/1995 | Kitamura .................. 264/40.5 |
| 5,683,630 | A | * | 11/1997 | Inoue ........................ 264/1.33 |
| 6,048,476 | A | * | 4/2000 | Lausenhammer et al. .. 264/40.5 |

FOREIGN PATENT DOCUMENTS

| AT | 365119 | 12/1981 |
| EP | 0359830 | 3/1990 |
| WO | WO 1/58662 | 8/2001 |

* cited by examiner

Primary Examiner—Mathieu D. Vargot
(74) Attorney, Agent, or Firm—Jordan and Hamburg LLP

(57) ABSTRACT

An injection-compression molding apparatus includes a stationary mold provided with a nozzle for injecting molten resin, and a movable mold driven by a servo motor. In compressing the resin, high-speed position control of the movable mold is first performed, which is then switched to speed feedback control which enables delicate regulation of clamping pressure in accordance with pressure fluctuations in the resin.

3 Claims, 5 Drawing Sheets

CLAMP PRESSURE CONTROL METHOD FOR INJECTION MOLDING PROCESS

BACKGROUND OF THE INVENTION

The present invention relates to a method for injection molding thin resin substrates for optical disks such as CDs and DVDs, and a clamp pressure control method for same.

SUMMARY OF THE INVENTION

It is an object of the present invention to provide a clamping pressure control method for an injection-compression molding process, by which molding operation time is reduced without compromising the quality of molded articles, as well as the product quality of accurately molded articles is improved.

To achieve the above-described objects, the present invention provides a method for compression-molding an optical disk substrate, wherein molten resin is injected into a cavity between a stationary mold and a movable mold and molded into a desired shape by compressing the resin between the stationary mold and the movable mold.

When moving the movable mold to a predetermined position where a clamping force is generated between the stationary mold and the movable mold, positioning control of the movable mold is effected so as to move the movable mold at high speed. Upon detection of the movable mold having reached the predetermined position, the positioning control of the movable mold is switched to clamping force control, so that the clamping force generated between the stationary mold and the movable mold reaches a first target value, wherein the speed of the movable mold is regulated in accordance with a difference between a target clamp pressure value and the clamping force being applied. Upon detection of the clamping force having reached a second target value which is lower than the first target value, the clamping force control by speed feedback is switched back to the positioning control.

According to the clamping pressure control method of the invention, during the initial period of the injection-compression molding, high-speed position control is performed, which makes high-speed clamping control possible. Subsequently, clamping force control is performed by speed feedback based on a detected clamping pressure at a low speed, which enables fine regulation of clamp pressure in accordance with various pressure fluctuations in resin and thereby improves the molding accuracy. As a result, a reduction in operation time and stability in the product quality of an accurately molded article are both achieved.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
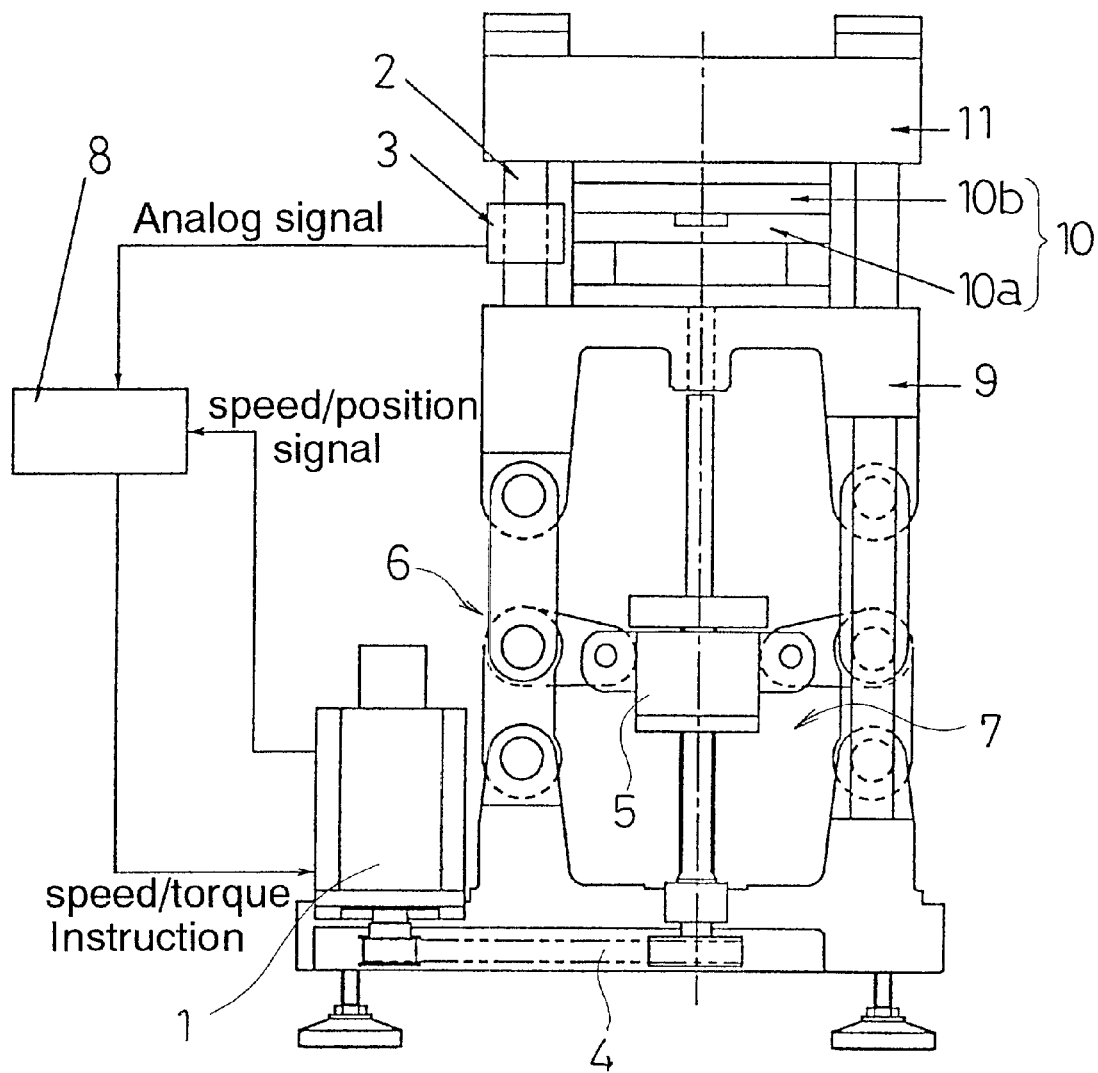
FIG. 1 is a schematic diagram illustrating the configuration of a mold clamping mechanism of an injection molding apparatus according to one embodiment of the present invention.

FIG. 1 is a schematic diagram of an injection-compression molding apparatus according to one embodiment of the present invention. The apparatus is mainly composed of a mold 10, a mold driving mechanism 7 for opening and closing the mold, and a control unit 8. The mold driving mechanism 7 includes a crank mechanism 5 for converting the rotary motion transmitted from a servomotor 1 by way of a belt 4 into transverse reciprocating motion, and a toggle mechanism 6 for converting the transverse reciprocating motion into vertical motion. The control unit 8 controls the speed and torque of the servomotor 1 in accordance with analog signals fed from a distortion sensor 3 serving as a clamping force detector and disposed on a tie bar 2. The mold 10 includes a lower mold 10a mounted on a lower platen 9 free to slide along the tie bar 2, and an upper mold 10b secured to a stationary upper platen 11 and is provided with a nozzle, through which molten resin is injected.

The control unit 8 shown in FIG. 1 effects feedback control of the servomotor based on analog signals fed from the distortion sensor 3 and speed/position signals from the servomotor 1. A clamping pressure control method according to one embodiment of the invention includes position control of the movable mold, and clamping force control which is effected by feed-back controlling the speed thereof based on detected clamping force.

Figure 2A:
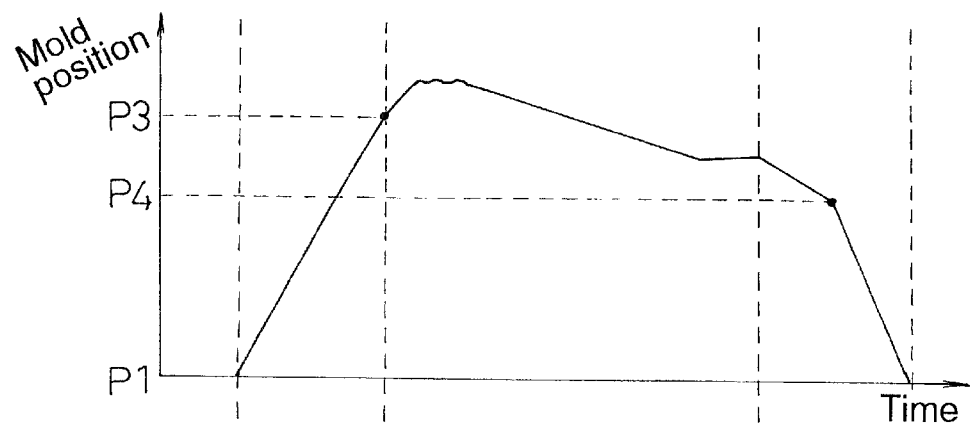
FIGS. 2A–2C are timing charts illustrating the clamping pressure control according to one embodiment of the invention.
Figure 2B:
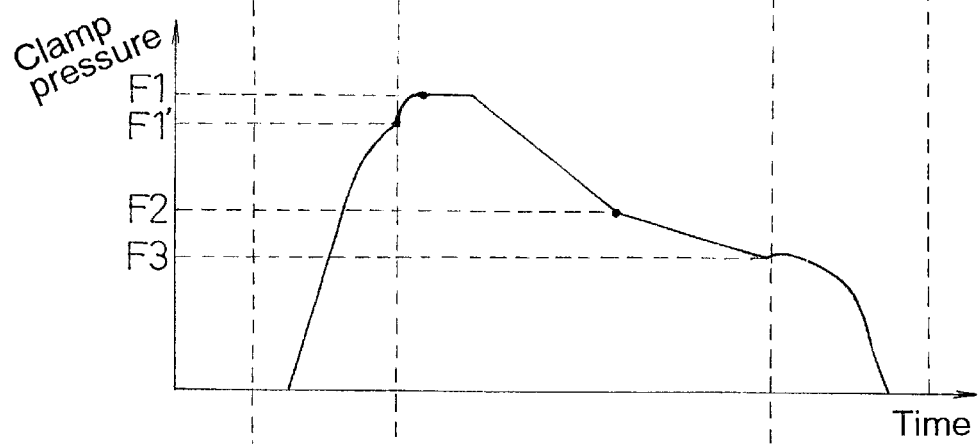
Figure 2C:
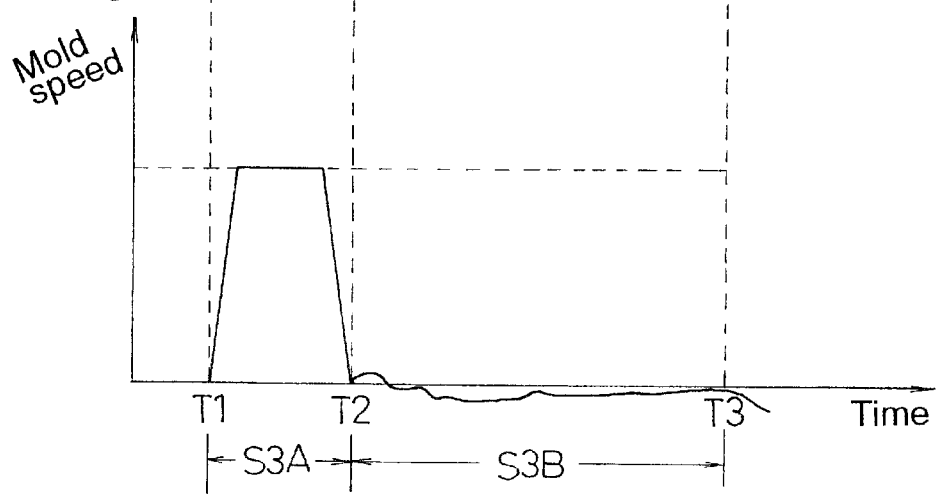

FIGS. 2A–2C are timing charts respectively showing the changes in position of the lower mold 10a, changes in the clamping pressure between the mold 10, and changes in the speed of the lower mold 10a during the injection-compression molding of resin. At T1, the lower mold is located at an injection start position P1 where no clamping force is generated between the mold 10. During the initial stage denoted at S3A in the drawing, the control unit 8 effects position control of the movable lower mold 10a. That is, the lower mold 10a is moved at high speed to a clamping position P3, where it applies a clamping force lower than a predetermined target value F1 as shown in FIGS. 2A and 2B. Thus the lower mold 10a is swiftly moved from the injection start position P1 to the clamping position P3 by the position control during the initial stage S3A from T1 to T2. The clamping position P3 may be predetermined such that a force slightly lower than a target clamping force F1 is applied between the mold based on the correlation between the position of the lower mold and the pressure applied between the molds, and preset in the control program data.

Upon detection of the lower mold 10a having reached the predetermined clamping position P3, the control unit 8 switches the control mode from position control to speed control which is based on the feedback of detected clamping force.

Figure 3:
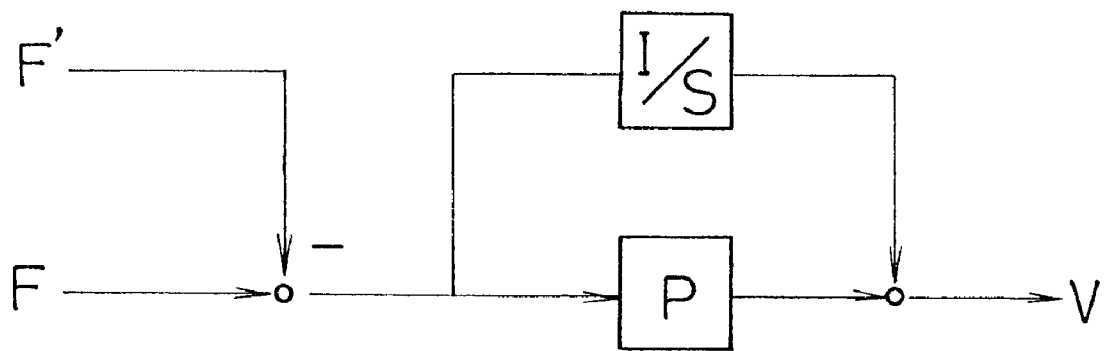
FIG. 3 is a schematic block diagram given in explanation of the clamping force control by speed feedback according to the invention.

More specifically, from T2, the control unit 8 generates a speed command which is proportional to the difference between the detected clamp pressure that is being actually applied and a target pressure value. FIG. 3 is a schematic control block diagram illustrating the speed control method in accordance with the invention. In the drawing, F denotes a target clamp pressure whereas F' denotes the detected pressure that is being applied. P represents a coefficient by which the difference between F and F' is multiplied. V represents a speed command value input to the servo motor. The speed command V is obtained by adding an integral of the difference between F and F1 multiplied by a predetermined coefficient I to the proportionally multiplied value of the difference between F and F'.

Thus the speed of the servomotor for driving the lower mold 10a is controlled in accordance with the proportionally multiplied value of the difference between a target clamp pressure and the pressure that is actually being applied. While such control takes time, it enables slight pressure fluctuations to be responsively followed, whereby regulation of pressure to be applied is achieved with a high degree of precision.

Compression of the resin is performed such that the pressure applied by the mold is gradually decreased as shown in FIG. 2B. That is, after a target clamp pressure F1 has been reached and maintained for a while, the lower mold is lowered so as to decrease the pressure. Thus reduced pressure values F2 and F3 are reached stepwise during the period S3B precisely by the above-described speed feedback control.

Upon detecting the clamp pressure having reached a predetermined value F3, the control unit 8 switches the control mode from the clamping force control back to the position control. Thus from T3, the lower mold 10a is swiftly moved to a predetermined position P4 and then back to an initial position.

The switching of the control mode from the position control to the clamping force control may be effected automatically upon detection of the clamp pressure having reached the value F1' which is slightly lower than the target value F1.

As described above, according to the clamping pressure control method of the invention, after or during the injection of resin, the lower mold is swiftly moved to a predetermined position by the high speed position control, and thereafter, the control mode is switched to the clamping force control which enables fine regulation of pressure to be achieved in accordance with pressure fluctuations in the resin. After the compression of resin when such delicate control of clamping pressure is no more necessary, the control mode is switched back to the fast position control. In this way, the present invention achieves a considerable reduction in process time without compromising the quality of resultant molded articles by combining different control modes during the injection and compression of resin.

Next, another embodiment of the clamping pressure control method in accordance with the invention will be described with reference to FIGS. 4A–4C and FIG. 5. The clamping pressure control method of this embodiment includes constant speed control of the movable lower mold 10a and speed feedback control thereof which is based on a detected clamping force.

Figure 4A:
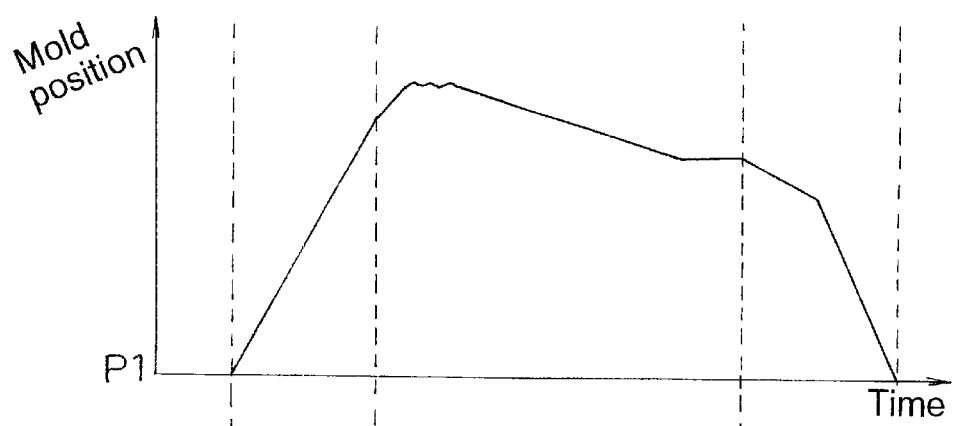
FIGS. 4A–4C are timing charts illustrating the clamping pressure control according to another embodiment of the invention.
Figure 4B:
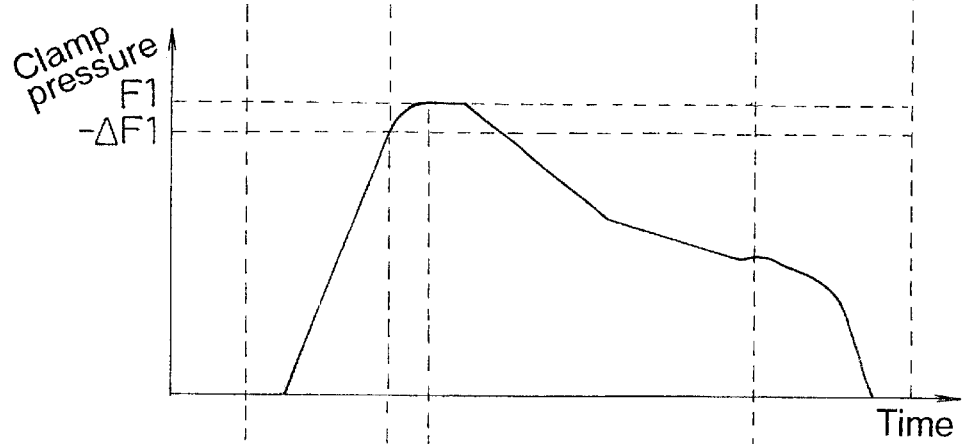
Figure 4C:
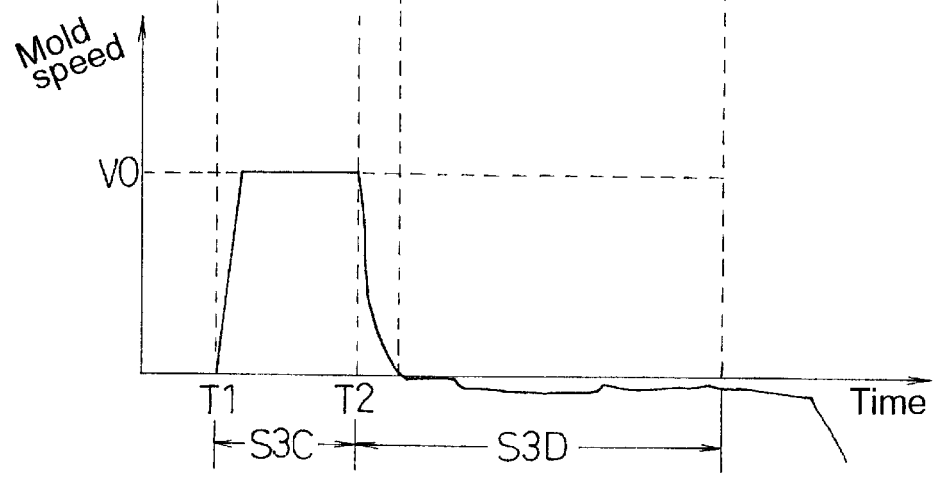

FIGS. 4A–4C are timing charts respectively showing the changes in position of the lower mold 10a, changes in the clamping pressure between the molds 10a and 10b, and changes in the speed of the lower mold 10a during the injection-compression molding of resin. At T1, the lower mold is located at the above-described injection start position P1. During the initial stage denoted at S3C in the drawing, the control unit 8 effects constant speed control of the movable lower mold 10a. That is, the lower mold 10a is moved at a predetermined, constant, high speed V0, until the pressure applied between the molds is detected to have reached a level $-\Delta 1$ which is lower than a target value F1 as shown in FIGS. 4B and 4C. The speed V0 may be predetermined based on the correlation between the speed of the lower mold and the pressure applied between the molds, and preset in the control program data. Thus the lower mold 10a is swiftly moved from the injection start position P1 to a clamping position by the constant speed control during the initial stage S3C from T1 to T2.

Upon detection of the clamping pressure having reached the predetermined level $-\Delta F1$, the control unit 8 switches the control mode from the constant speed control to speed feedback control which is based on the detected clamping force.

At T2 when the control mode is switched to the speed feedback control, the speed of the movable lower mold 10a is lowered so that the target clamping pressure F1 is precisely achieved. Here, the target clamp pressure F1 must not be overshot to ensure uniform high quality of molded articles, and therefore the speed of the lower mold is instantly decreased upon the switching of the control modes at T2. Thereafter, during the period S3D, the above-described speed feedback control is effected.

Figure 5:
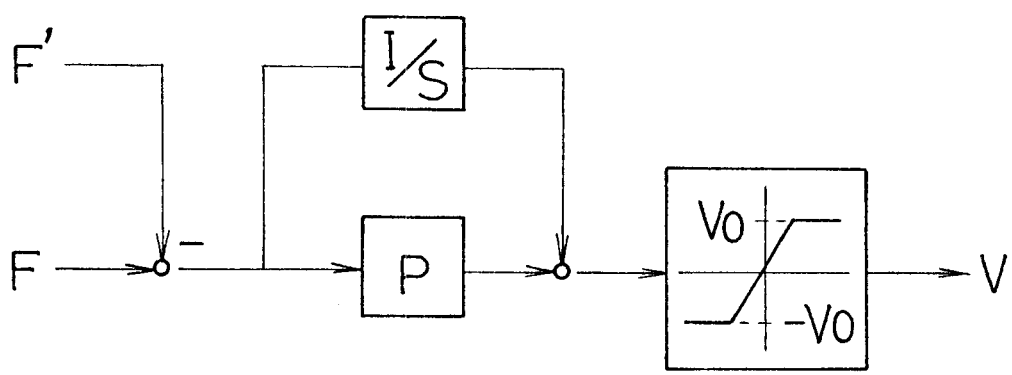
FIG. 5 is a schematic block diagram given in explanation of the clamping force control by speed feedback according to the invention.

The constant speed control is effected such that, the speed of the lower mold is maintained constant by a speed command which is proportional to the difference between a target speed and the actual speed. In order to prevent undesired overshoot of the lower mold when the control modes are changed at T2, a speed limit may be provided in the speed feedback control as shown in FIG. 5. That is, in producing speed command control V, a limit may be given so that the speed of the lower mold will never exceed the predetermined value V0.

In this way, the lower mold 10a is first moved at high, constant speed, whereby a reduction in process time is achieved. The control mode is switched to speed feedback control and the speed of the lower mold instantly decreased as soon as the clamp pressure level has reached the level $-\Delta F1$ which is lower than the target value F1. As a result, the target value F1 is precisely achieved without the risk of overshooting.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A method for compression-molding an optical disk substrate, wherein molten resin is injected into a cavity between a stationary mold and a movable mold and molded into a desired shape by compressing the resin between the stationary mold and the movable mold, comprising:

moving the movable mold from an initial position to a first position where no clamping force is generated between the stationary mold and the movable mold;

injecting molten resin into the cavity between the stationary mold and the movable mold;

moving the movable mold to a second position where a clamping force is generated between the stationary mold and the movable mold by positioning control of the movable mold;

switching the positioning control of the movable mold to clamping force control upon detection of the movable mold having reached the second position;

moving the movable mold to and maintaining same at a third position by the clamping force control, so that the clamping force generated between the stationary mold and the movable mold reaches a first target value, wherein the speed of the movable mold is regulated in accordance with a difference between a target clamp pressure value and the clamping force being applied;

switching the clamping force control to the positioning control upon detection of the clamping force having reached a second target value which is lower than the first target value; and returning the movable mold to the initial position by the positioning control.

2. The method for compression-molding an optical disk substrate according to claim 1, wherein, upon detection of the clamping force having reached a level lower than the first target value before the movable mold reaches the second position, the positioning control of the movable mold is switched to the clamping force control.

3. A method for compression-molding an optical disk substrate, wherein molten resin is injected into a cavity between a stationary mold and a movable mold and molded into a desired shape by compressing the resin between the stationary mold and the movable mold, comprising:

positioning the movable mold at a first position where no clamping force is generated between the stationary mold and the movable mold;

injecting molten resin into the cavity between the stationary mold and the movable mold;

moving the movable mold at a constant speed by constant speed control of the movable mold;

switching the constant speed control of the movable mold to speed feedback control thereof upon detection of a clamping force having fallen within a range under a target value;

moving the movable mold toward the stationary mold by the speed feedback control of the movable mold, so that the clamping force generated between the stationary mold and the movable mold reaches the target value, wherein the speed of the movable mold is regulated in accordance with a difference between a target clamp pressure value and the clamping force being applied.

* * * * *